US012709079B2

(12) United States Patent
Yang et al.

(10) Patent No.: US 12,709,079 B2
(45) Date of Patent: Aug. 18, 2026

(54) PASSENGER RADIAL TIRE FORMING MACHINE AND CASE THEREOF

(71) Applicants: MESNAC CO., LTD., Qingdao (CN); QINGDAO MESNAC MACHINERY & ELECTRIC ENGINEERING CO., LTD., Qingdao (CN)

(72) Inventors: Huili Yang, Qingdao (CN); Fengxin Sun, Qingdao (CN); Yaxiong Chen, Qingdao (CN)

(73) Assignees: MESNAC CO., LTD., Qingdao (CN); QINGDAO MESNAC MACHINERY & ELECTRIC ENGINEERING CO., LTD., Qingdao (CN)

( * ) Notice: Subject to any disclaimer, the term of this patent is extended or adjusted under 35 U.S.C. 154(b) by 0 days.

(21) Appl. No.: 18/723,856

(22) PCT Filed: Dec. 22, 2022

(86) PCT No.: PCT/CN2022/141185
§ 371 (c)(1),
(2) Date: Jun. 24, 2024

(87) PCT Pub. No.: WO2023/116846
PCT Pub. Date: Jun. 29, 2023

(65) Prior Publication Data

US 2025/0065584 A1 Feb. 27, 2025

(30) Foreign Application Priority Data

Dec. 22, 2021 (CN) ......................... 202123260108.9

(51) Int. Cl.
*B29D 30/26* (2006.01)

(52) U.S. Cl.
CPC .................................... *B29D 30/26* (2013.01)

(58) Field of Classification Search
CPC ..... B29D 30/0061; B29D 30/24; B29D 30/26
(Continued)

(56) References Cited

U.S. PATENT DOCUMENTS 3,138,510 A * 6/1964 Hindin .................. B29D 30/36 156/367
3,235,435 A * 2/1966 Pouilloux ............ B29D 30/245 156/416
(Continued)

FOREIGN PATENT DOCUMENTS

| | | |
|---|---|---|
| CN | 201538052 | 8/2010 |
| CN | 204674048 | 9/2015 |
| CN | 110594412 | 12/2019 |

OTHER PUBLICATIONS

Yang H, CN204674048U, updated machine translation. (Year: 2015).*

*Primary Examiner* — Sedef E Paquette
(74) *Attorney, Agent, or Firm* — Jiwen Chen; Joywin IP Law PLLC

(57) ABSTRACT

A passenger radial tire forming machine and a case thereof. The machine includes: a rotating main shaft, the rotating main shaft being provided with an air supply passage and a threading passage; an electric slip ring device fixedly connected to the rotating main shaft, the electric slip ring device being connected to a gas supply device and a power supply device; a drum device fixedly connected to the rotating main shaft, the air supply device being in communication with an air passage inlet of the drum device via the air supply pipeline, and the power supply device being electrically connected to the drum device via a cable arranged in the threading passage.

4 Claims, 2 Drawing Sheets

(58) Field of Classification Search
USPC ............................................ 156/394.1, 414
See application file for complete search history.

(56) References Cited

U.S. PATENT DOCUMENTS

| | | | | |
|---|---|---|---|---|
| 5,190,605 | A * | 3/1993 | Holroyd | B29D 30/245 156/416 |
| 2014/0027063 | A1 | 1/2014 | Marechal et al. | |
| 2021/0178714 | A1* | 6/2021 | Miyake | B29D 30/3042 |

* cited by examiner

PASSENGER RADIAL TIRE FORMING MACHINE AND CASE THEREOF

CROSS-REFERENCE TO RELATED APPLICATION

This is a U.S. national stage application of PCT Application No. PCT/CN2022/141185 under 35 U.S.C. 371, filed Dec. 22, 2022 in Chinese, claiming priority to and the benefit of Chinese Patent Application No. 202123260108.9, filed with the China National Intellectual Property Administration (CNIPA) on Dec. 22, 2021, all of which are hereby incorporated by reference in their entirety.

TECHNICAL FIELD

The present application relates to the technical field of tire processing, and in particular to a radial tire forming machine and a case thereof.

BACKGROUND TECHNOLOGY

The case of a passenger radial tire forming machine is a device for bonding rubber materials to a drum device. The case needs to provide a necessary air source for the operation of the drum device. The drum device is connected to a rotating main shaft of the case. When the case rotates the main shaft, the drum device can be driven to rotate so as to bond the rubber materials.

Currently, the air supply lines and the cables installed in the case of the existing radial tire molding machine are exposed, and the lines are complicated.

Therefore, it is an urgent problem for those skilled in the art how to provide a cabinet for riding a radial tire molding machine and to simplify the circuit.

SUMMARY OF THE INVENTION

In view of the above, the present application provides a case of a radial tire forming machine for passenger use, simplifying the circuit. The present application also provides a radial tire forming machine for passenger use having a case of the radial tire forming machine for passenger use.

To achieve the above object, the present disclosure provides the following technical solutions:

A cabinet for a radial tire molding machine, comprising:

a rotating main shaft provided with an air supply passage and a threading passage;

an electric slip ring device fixedly connected to the rotating main shaft, the electric slip ring device being connected to a gas supply device and a power supply device;

a drum device fixedly connected to the rotating main shaft, the air supply device being in communication with an air passage inlet of the drum device via the air supply pipeline, and the power supply device being electrically connected to the drum device via a cable arranged in the threading passage.

Preferably, the box of the riding radial tire forming machine further comprises an air chamber, the air chamber is arranged between the rotating main shaft and the electric sliding ring device, the air supply device is in communication with the air chamber, and the air chamber is in communication with an air passage inlet of the drum device via the air supply pipeline.

Preferably, the casing of the described passenger radial tire forming machine further comprises a pneumatic valve island fixed on the rotating main shaft, and the pneumatic valve island is in communication with the air supply passage and is used for controlling the gas flow flux.

Preferably, in the case of the described radial tire forming machine, the air cavity and the drum device are respectively located at two ends of the rotating main shaft, and the air supply duct and the line passage are both arranged to extend in the axial direction of the rotating main shaft.

Preferably, the chassis of the riding radial tire molding machine further comprises a power supply module fixed on the rotating main shaft, and the power supply module is electrically connected to both the air supply device and the drum device.

Preferably, the chassis of the riding radial tire molding machine further comprises an I/O module for receiving and transmitting a control signal of the pneumatic valve island and a signal of a detecting device in the drum device, and the I/O module is electrically connected to all of the detecting device in the drum device, the pneumatic valve island and the power supply module.

Preferably, the chassis of the riding radial tire molding machine further comprises a first wireless communication module; the I/O module receives and transmits signals from the pneumatic valve islands and the detecting devices in the drum device via the first wireless communication module; the first wireless communication module is electrically connected to both the power supply module and the I/O module;

a second wireless communication module, wherein the second wireless communication module is fixed on a chassis frame and is in a communication connection with a device information processing main station, and the first wireless communication module is in a communication connection with the second wireless communication module.

A radial tire forming machine for passenger use, comprising a housing of the radial tire forming machine for passenger use, wherein the housing of the radial tire forming machine for passenger use is the housing of the radial tire forming machine for passenger use as claimed in any one of the preceding claims.

Provided in the present application is a case for riding a radial tire molding machine. By providing an air supply pipeline and a threading passage on a rotating main shaft, the positions of a gas and a cable are provided, and the pipeline is simplified, and the air supply pipeline and the cable are no longer bare.

BRIEF DESCRIPTION OF THE DRAWINGS

To describe the technical solutions in the embodiments of the present application or in the prior art more clearly, the following briefly introduces the accompanying drawings required for describing the embodiments or the prior art, Apparently, the accompanying drawings in the following description show merely some embodiments of the present application, other drawings may also be obtained according to these drawings without creative efforts.

DETAILED DESCRIPTION OF THE EMBODIMENTS

Disclosed is a case of a passenger radial tire forming machine and a simplified circuit. Also disclosed is a passenger radial tire forming machine having a case of the passenger radial tire forming machine.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall belong to the scope of protection of the present application.

Figure 1:
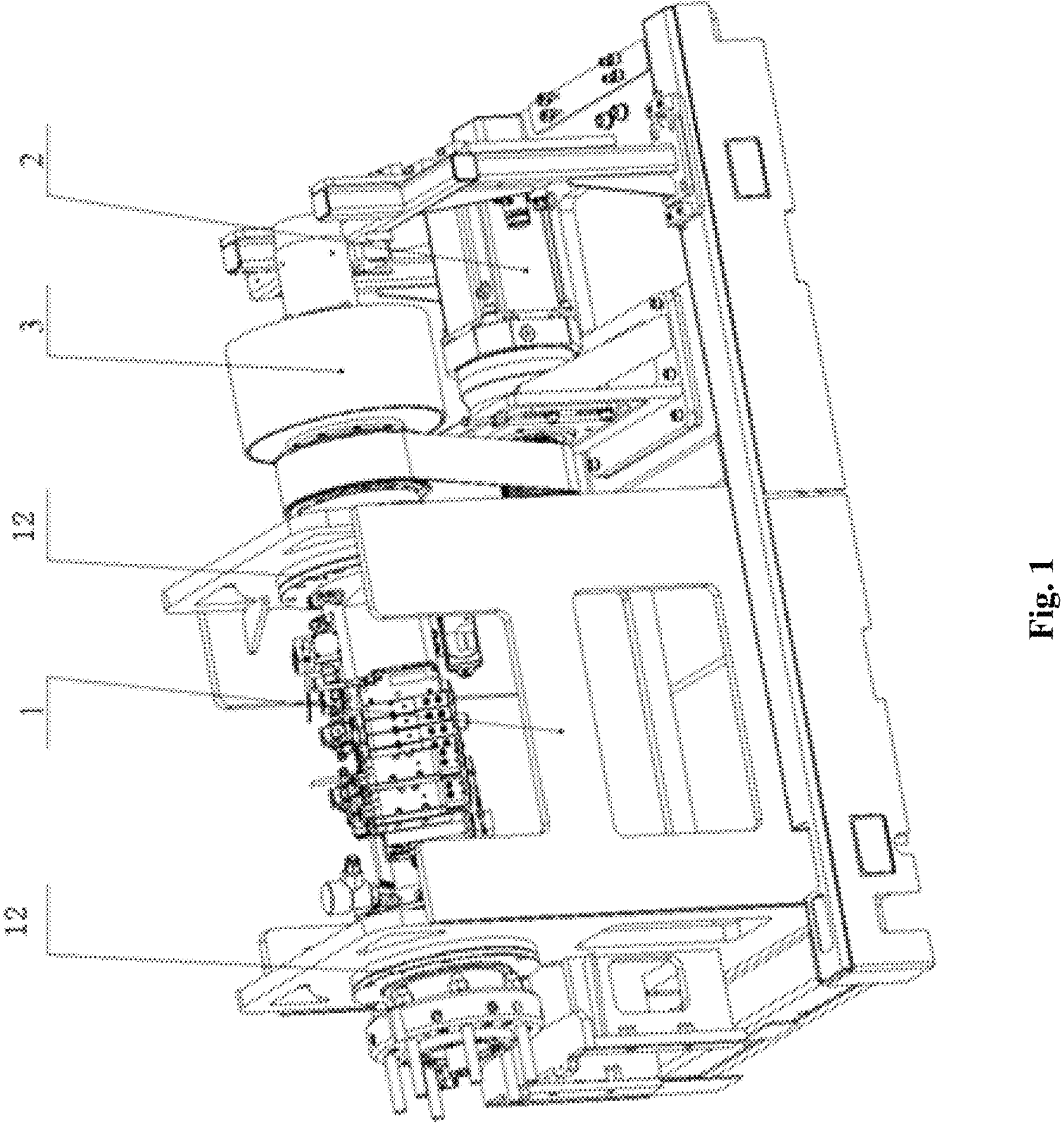
FIG. 1 is a structural schematic diagram of a chassis of a radial tire forming machine disclosed in an embodiment of the invention.
Figure 2:
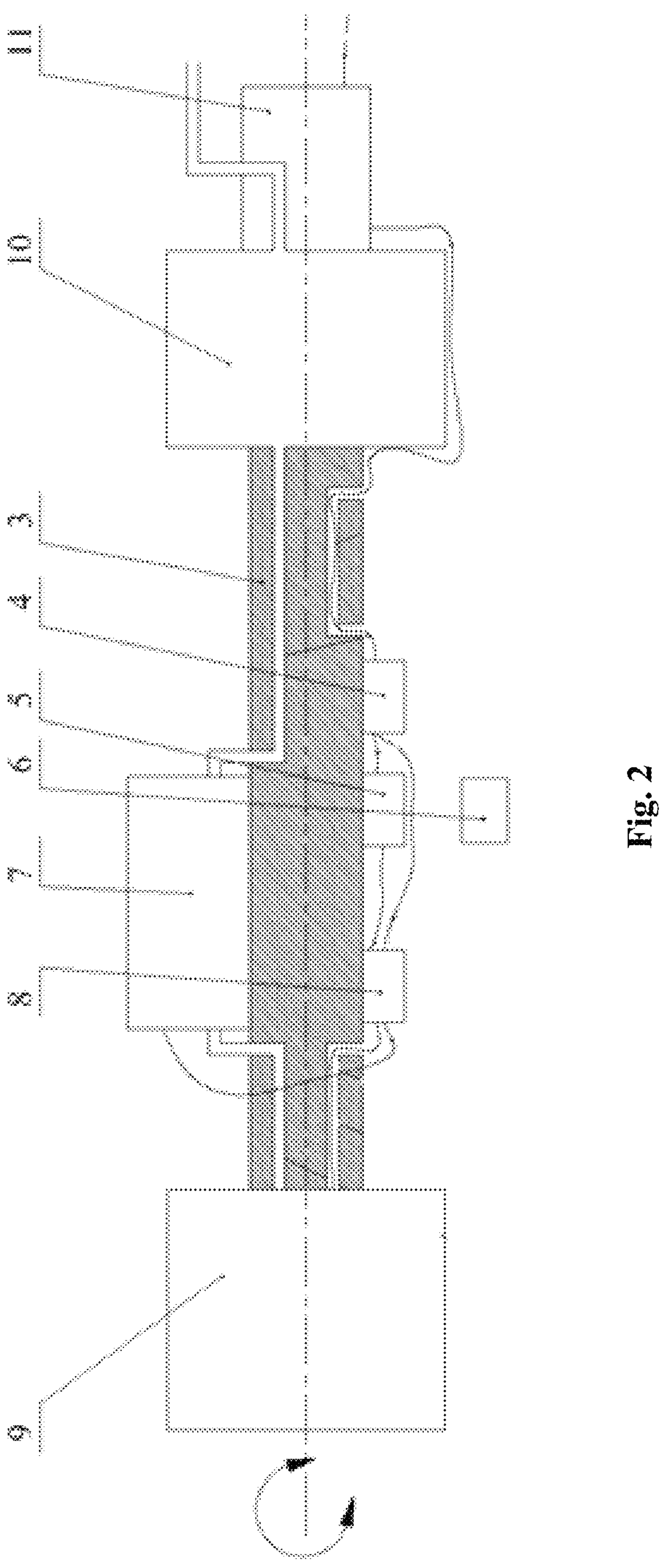
FIG. 2 is a schematic view of a rotating main shaft connection structure of a chassis of a radial tire forming machine disclosed in an embodiment of the present application.

As shown in FIG. 1, the present application further discloses a case of a radial tire forming machine, comprising a rotating main shaft 3, an electric slip ring device 11 and a drum device 9. wherein a gas supply passage and a threading passage are provided on the rotating main shaft 3; an electric slip ring device 11 is fixedly connected to the rotating main shaft 3, the electric slip ring device 11 is connected to a gas supply device and a power supply device, and the electric slip ring device 11 is used for converting external fixed air supply and fixed power supply, so that an air path and a cable rotate together with the rotating main shaft 3; The drum device 9 is fixedly connected to the rotating main shaft 3, and the adhesive is bonded during the rotation of the drum device 9. The air supply device is in communication with an air passage inlet of the drum device 9 via an air supply passage, and the power supply device is electrically connected to the drum device 9 via a cable arranged in the threading passage. In the present application, by providing an air supply pipeline and a threading pipeline on the rotating main shaft 3, the positions of the gas and the cable are provided, and the pipeline is simplified, and the air supply pipeline and the cable are no longer bare.

the case of the passenger radial tire forming machine in the present application further comprises an air chamber 10, in which the air chamber 10 is arranged between the rotating main shaft 3 and the electric slip ring device 11, the air supply device is in communication with the air chamber 10, and the air chamber 10 is in communication with an air passage inlet of the drum device 9 via an air supply passage. The air cavity 10 is used for storing air, and ensures the air volume used for the operation of the drum device 9. If the air volume supplied by the electric sliding ring device 11 can meet the usage of the drum device 9, the device may be an unnecessary device. The size and shape of the air cavity 10 can be set according to different requirements, and are all within a protection range.

The chassis of the above described passenger radial tire molding machine further comprises a pneumatic valve island 7 fixed to the rotation spindle 3, and the pneumatic valve island 7 is in communication with the air supply duct and is used for controlling the gas flow flux. The gas flow rate of the gas supply passage can be controlled by arranging the pneumatic valve bridge 7 as a control valve, comprising cutting off the gas supply passage and conducting the gas supply passage. For the specific structure of the pneumatic valve islets 7, reference can be made to the existing valve structure.

In a specific embodiment, the air cavity 10 and the drum device 9 are respectively located at two ends of the rotating main shaft 3, and the air supply pipeline and the threading pipeline are both arranged in the axial extension of the rotating main shaft 3. Disclosed herein are a specific mounting position of an air cavity 10 and a drum device 9, and an arrangement of an air supply passage and a threading passage. In practice, in order to achieve the connection of other components, a radial channel is provided on a rotating main shaft 3 for the communication of the other components with the air supply passage or the threading passage.

The case of the passenger radial tire forming machine disclosed in the present application further comprises a power supply module 4 fixed on the rotating main shaft 3, wherein the power supply module 4 is electrically connected to both the air supply device and the drum device 9. The power supply module 4 is arranged to supply power to electrical devices on the chassis, and the power supply module 4 may be a battery.

A further embodiment further comprises an I/O module 8 for receiving and transmitting control signals from the pneumatics valve bridge 7 and detection means within the drum unit 9, the I/O module 8 being electrically connected to the detection means within the drum unit 9, the pneumatics valve bridge 7 and the power module 4. The collection and transmission of signals of the detection devices in the pneumatic valve bridge 7 and the drum device 9 are realized through the I/O module 8, thereby realizing information exchange between the detection devices in the pneumatic valve bridge 7 and the drum device 9 and the first wireless communication module 5.

In a still further embodiment, the chassis further includes a first wireless communication module 5 and a second wireless communication module 6. wherein the I/O module 8 transmits and receives signals from the pneumatic valve islands 7 and detection devices in the drum device 9 via the first wireless communication module 5, and the first wireless communication module 5 is electrically connected to both the power supply module 4 and the I/O module 8; The second wireless communication module 6 is fixed on the chassis frame 1 and is in communication connection with the device information processing main station, and the first wireless communication module 5 is in signal connection with the second wireless communication module 6. Disclosed is a control method. Specifically, control is implemented by means of signal transmission.

In addition, the present application further discloses a radial tire forming machine for passenger use, comprising a casing of the radial tire forming machine for passenger use, wherein the casing of the radial tire forming machine for passenger use is the casing of the radial tire forming machine for passenger use disclosed in the above embodiments; therefore, the radial tire forming machine for passenger use having the casing of the radial tire forming machine for passenger use also has all the described technical effects, which will not be repeated herein.

In particular, the passenger radial tire molding machine comprises a chassis frame 1, a power device 2, a rotating main shaft 3 and a support bearing 12, wherein the chassis frame 1 provides rigid support for the entire box body and can be provided in a main line of the molding machine equipment. the power device 2, the rotating main shaft 3 and the supporting bearing 12 are all mounted in the described chassis frame 1; the power device 2 provides power for the rotation of the rotating main shaft 3; The rotating main shaft 3 rotates around its own rotation center; the wireless power supply and communication components are all mounted on the outer surface thereof; and the inner air supply pipeline and the threading channel can transport gas and penetrate cables.

The embodiments in this description are described in a progressive manner, each embodiment focuses on a difference from other embodiments, and reference may be made to each other for the same or similar parts of the embodiments.

The above descriptions of the disclosed embodiments enable a person skilled in the art to implement or use the present application. Various modifications to these embodiments will be readily apparent to those skilled in the art. The general principles defined herein may be implemented in other embodiments without departing from the spirit or scope of the present application. Accordingly, the present application will not be limited to the embodiments shown herein but is to be accorded the widest scope consistent with the principles and novel features disclosed herein.

What is claimed is:

1. A cabinet of a radial tire molding machine, comprising:

a rotating main shaft, the rotating main shaft being provided with an air supply pipeline and a threading pipeline, wherein the air supply pipeline is adapted for supplying air;

an electric slip ring device fixedly connected to the rotating main shaft for connecting a gas supply device and a power supply device;

a drum device, wherein the drum device is fixedly connected to the rotating main shaft, the air supply pipeline is in communication with an air passage inlet of the drum device, and a cable electrically connected to the drum device is provided in the threading pipeline;

further comprising a pneumatic valve fixed on the rotating main shaft, wherein the pneumatic valve is in communication with an air supply duct and is used for controlling gas flow flux;

further comprising a power supply module fixed on the rotating main shaft, wherein the power supply module is electrically connected to the drum device;

further comprising an I/O module, wherein the I/O module is used for receiving and transmitting a control signal of the pneumatic valve and a signal of a detecting device in the drum device, respectively, and the I/O module is electrically connected to the detecting device in the drum device, the pneumatic valve, and the power supply module;

further comprising a first wireless communication module, wherein the I/O module transmits and receives signals from the pneumatic valve and detection devices in the drum device via the first wireless communication module; the first wireless communication module is electrically connected to both the power supply module and the I/O module;

further comprising a second wireless communication module, wherein the second wireless communication module is fixed on a cabinet frame and is in communication with a device information processing main station, and the first wireless communication module is in communication with the second wireless communication module.

2. The cabinet of the radial tire molding machine according to claim 1, further comprising an air chamber, wherein the air chamber is arranged along the rotating main shaft and between the air supply pipeline and the electric slip ring device, and the air chamber is in communication with the air passage inlet of the drum device through the air supply pipeline.

3. The cabinet of the radial tire molding machine according to claim 2, characterized in that the air chamber and the drum device are located at two ends of the rotating main shaft, respectively, and an air supply duct and an air delivery duct both extend along an axial direction of the rotating main shaft.

4. A passenger radial tire molding machine, comprising a housing of the passenger radial tire molding machine, a gas supply device and a power supply device, wherein the gas supply device and the power supply device are respectively connected to an electric slide ring device of the housing of the passenger radial tire molding machine, and the housing of the passenger radial tire molding machine is the cabinet of the radial tire molding machine according to claim 1.

* * * * *